(12) United States Patent
Dunnam et al.

(10) Patent No.: US 8,099,134 B2
(45) Date of Patent: Jan. 17, 2012

(54) VISUAL MANIPULATION OF AUDIO

(75) Inventors: Daniel Spurgeon Dunnam, Brooklyn, NY (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 498 days.

(21) Appl. No.: 12/339,226

(22) Filed: Dec. 19, 2008

(65) Prior Publication Data

US 2010/0159892 A1 Jun. 24, 2010

(51) Int. Cl.
*H04B 1/38* (2006.01)
(52) U.S. Cl. ............... 455/566; 455/412.1; 455/413; 455/575.3; 455/575.4
(58) Field of Classification Search ............... 455/566, 455/412.1, 413, 414.1, 414.4
See application file for complete search history.

(56) References Cited

U.S. PATENT DOCUMENTS

| 6,559,868 | B2* | 5/2003 | Alexander et al. | 715/781 |
|---|---|---|---|---|
| 2009/0061827 | A1* | 3/2009 | Bulgin et al. | 455/413 |
| 2009/0068943 | A1* | 3/2009 | Grandinetti et al. | 455/3.06 |
| 2009/0125299 | A1* | 5/2009 | Wang | 704/201 |
| 2009/0165634 | A1* | 7/2009 | Mahowald | 84/610 |
| 2010/0056128 | A1* | 3/2010 | Hwang et al. | 455/418 |
| 2010/0121636 | A1* | 5/2010 | Burke et al. | 704/233 |
| 2010/0167699 | A1* | 7/2010 | Sigmund et al. | 455/413 |
| 2010/0231537 | A1* | 9/2010 | Pisula et al. | 345/173 |
| 2011/0098056 | A1* | 4/2011 | Rhoads et al. | 455/456.1 |

* cited by examiner

*Primary Examiner* — Linh Nguyen

(57) ABSTRACT

A mobile communication device displays, via a display, an audio waveform associated with a voicemail received by the mobile communication device, and receives selection and sustained contact with the audio waveform from a user associated with the mobile communication device. The device also enlarges a portion of the audio waveform based on the sustained contact with the audio waveform, and displays, via the display, the enlarged portion of the audio waveform. The device further enables the user to manipulate, via the display, the enlarged portion of the audio waveform, and provides, via a speaker, audible feedback associated with the manipulated enlarged portion of the audio waveform.

26 Claims, 13 Drawing Sheets

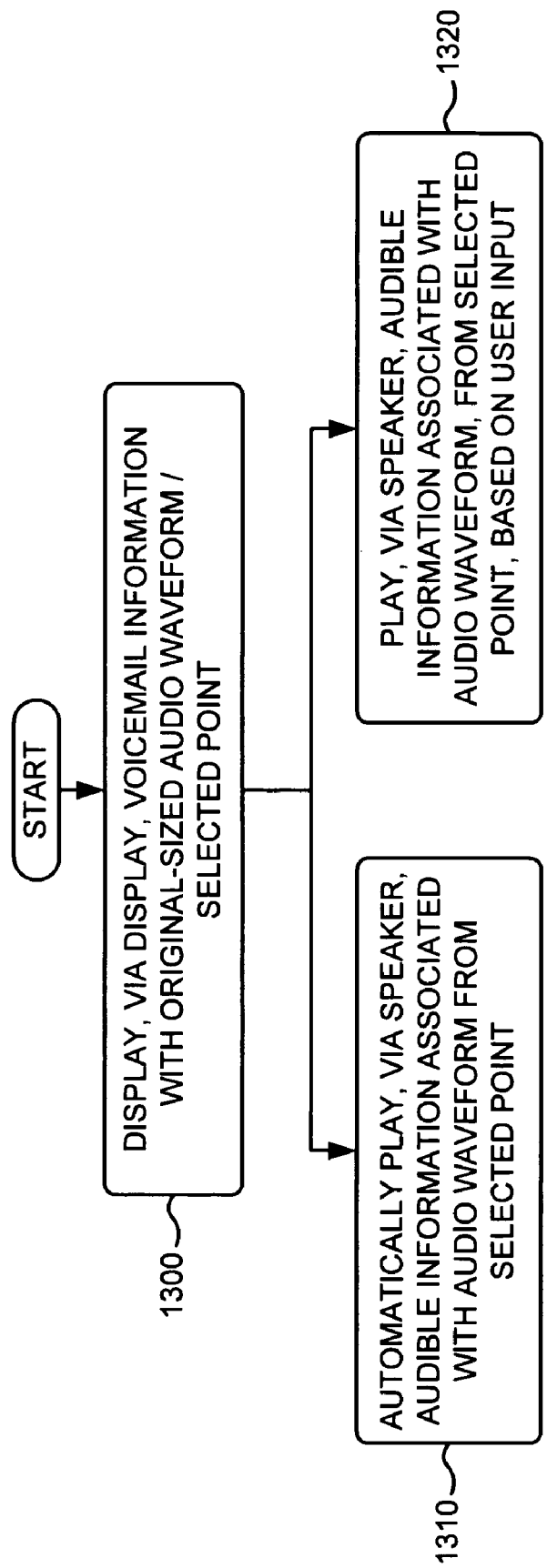

VISUAL MANIPULATION OF AUDIO

BACKGROUND

Devices, such as mobile communication devices (e.g., cell phones, personal digital assistants (PDAs), etc.), include touch sensitive input devices (e.g., touch sensitive interfaces or displays, touch screens, etc.). Touch screens are usually formed with either a resistive or capacitive film layer, located above a display, which is used to sense a touch of the user's finger or a stylus. Some touch screens enable the user to input information (e.g., text, numbers, etc.) via a keyboard or a keypad displayed on the touch screen, and to view information (e.g., voicemails received by the device). However, the size of a touch screen may be limited due to the size of the device containing the touch screen. Smaller touch screens may display information associated with a voicemail in close proximity to one another. The closely-arranged, voicemail information may be difficult to manipulate by the user. For example, the user's finger may accidently select undesired voicemail information, which may cause incorrect input to the device.

BRIEF DESCRIPTION OF THE DRAWINGS

FIGS. 10-13 illustrate flow charts of an exemplary process for performing interactive voicemail operations with a touch screen of a device according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user to interact with voicemail information displayed by a touch screen of a mobile communication device (e.g., a cell phone, a PDA, etc.). The systems and/or methods may enable the user to zoom in on an audio waveform associated with the voicemail information, to manipulate the audio waveform (e.g., move to different portions of the audio waveform), and to zoom out from the audio waveform. Such an arrangement may enable the user to visually manipulate the audio waveform, in an accurate manner, using a small touch screen-based device.

In one implementation, for example, the systems and/or methods may display, via a display (e.g., a touch screen) associated with a device, an audio waveform associated with a voicemail, may receive user selection and sustained contact with a portion of the audio waveform, and may enlarge the audio waveform based on the user's sustained contact with the selected portion of the audio waveform. The systems and/or methods may display, via the display, the enlarged audio waveform in a full-screen view, may enable the user to manipulate the enlarged audio waveform, and may provide, via a speaker associated with the device, audible feedback of the manipulated audio waveform. The systems and/or methods may receive user selection and release of a point on the enlarged audio waveform, may reduce the audio waveform to its original size, and may display, via display, the original-sized audio waveform and the selected point.

As used herein, the term "user" is intended to be broadly interpreted to include a mobile communication device or a user of a mobile communication device. The term "touch screen," as used herein, is intended to be broadly interpreted to include a touch screen display, a touch sensitive input device, a touch sensitive interface, etc.

Figure 1:
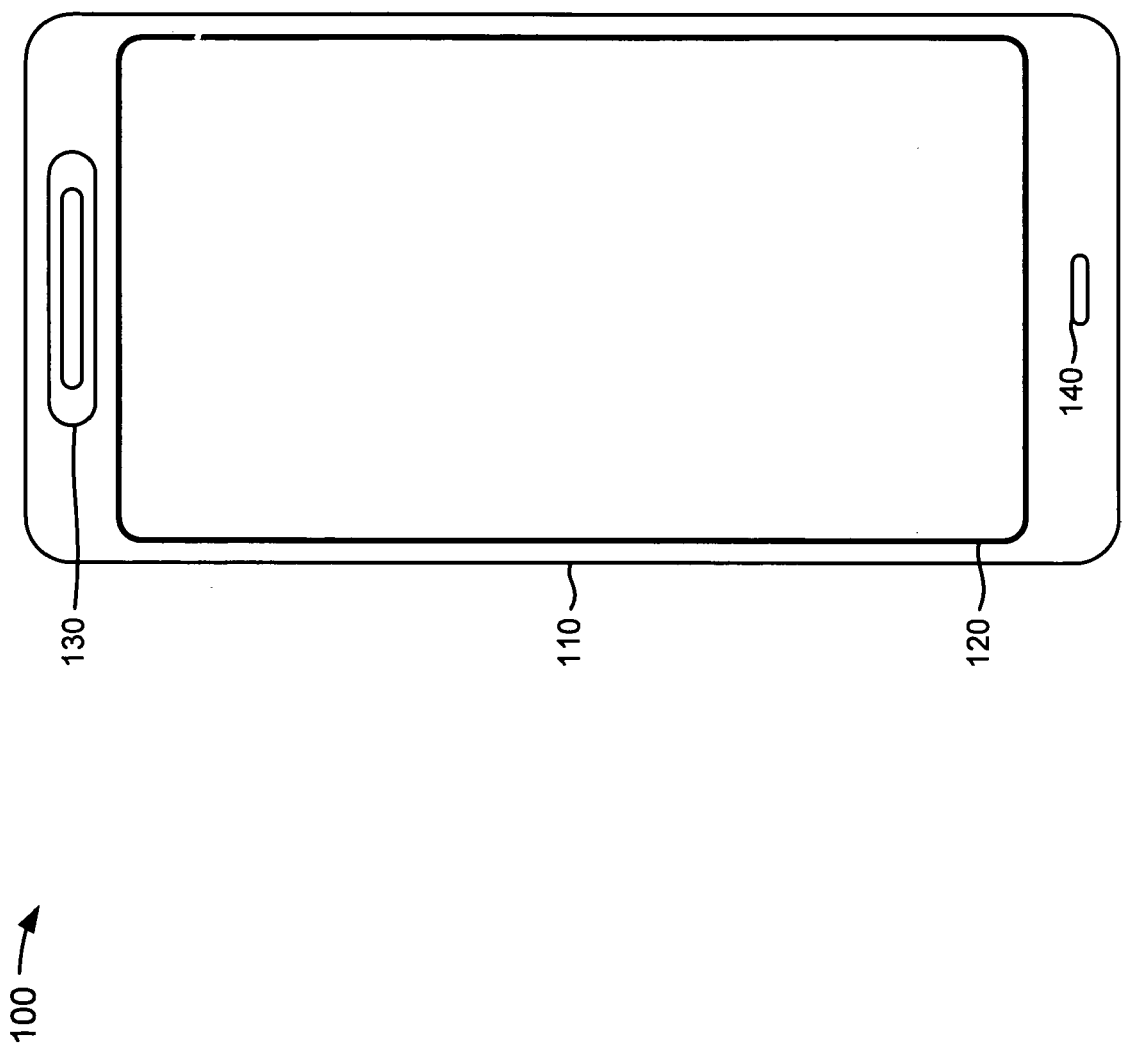
FIG. 1 depicts a diagram of an exemplary device in which systems and/or methods described herein may be implemented.

FIG. 1 is a diagram of an exemplary mobile communication device (hereinafter referred to as "device 100") in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a portable gaming system, a global positioning system (GPS) device, a media playing device (e.g., an MPEG audio layer 3 (MP3) player, portable multimedia player (PMP), a portable video player, etc.), any other mobile device capable of utilizing a touch screen display, a thread or process running on one of these devices, and/or an object executable by one of these devices. As illustrated in FIG. 1, device 100 may include a housing 110, a display 120, a speaker 130, and/or a microphone 140.

Housing 110 may protect the components of device 100 from outside elements. Housing 110 may include a structure configured to hold devices and components used in device 100, and may be formed from a variety of materials. For example, housing 110 may be formed from plastic, metal, or a composite, and may be configured to support display 120, speaker 130, and/or microphone 140.

Display 120 may provide visual information to the user. For example, display 120 may display text input into device 100, text, images, video, and/or graphics received from another device, and/or information regarding incoming or outgoing calls or text messages, emails, media, games, phone books, address books, the current time, etc. In one implementation, display 120 may include a touch screen display that may be configured to receive a user input when the user touches display 120. For example, the user may provide an input to display 120 directly, such as via the user's finger, or via other input objects, such as a stylus. User inputs received via display 120 may be processed by components and/or devices operating in device 100. The touch screen display may permit the user to interact with device 100 in order to cause device 100 to perform one or more operations. Further details of display 120 are provided below in connection with, for example, FIGS. 2-9.

Speaker 130 may provide audible information to a user of device 100. Speaker 130 may be located in an upper portion of device 100, and may function as an ear piece when a user is engaged in a communication session using device 100. Speaker 130 may also function as an output device for music and/or audio information associated with games, voicemails, and/or video images played on device 100.

Microphone 140 may receive audible information from the user. Microphone 140 may include a device that converts speech or other acoustic signals into electrical signals for use by device 100. Microphone 140 may be located proximate to a lower side of device 100.

Although FIG. 1 shows exemplary components of device 100, in other implementations, device 100 may contain fewer, different, differently arranged, or additional components than depicted in FIG. 1. In still other implementations, one or more components of device 100 may perform one or more other tasks described as being performed by one or more other components of device 100.

Figure 2:
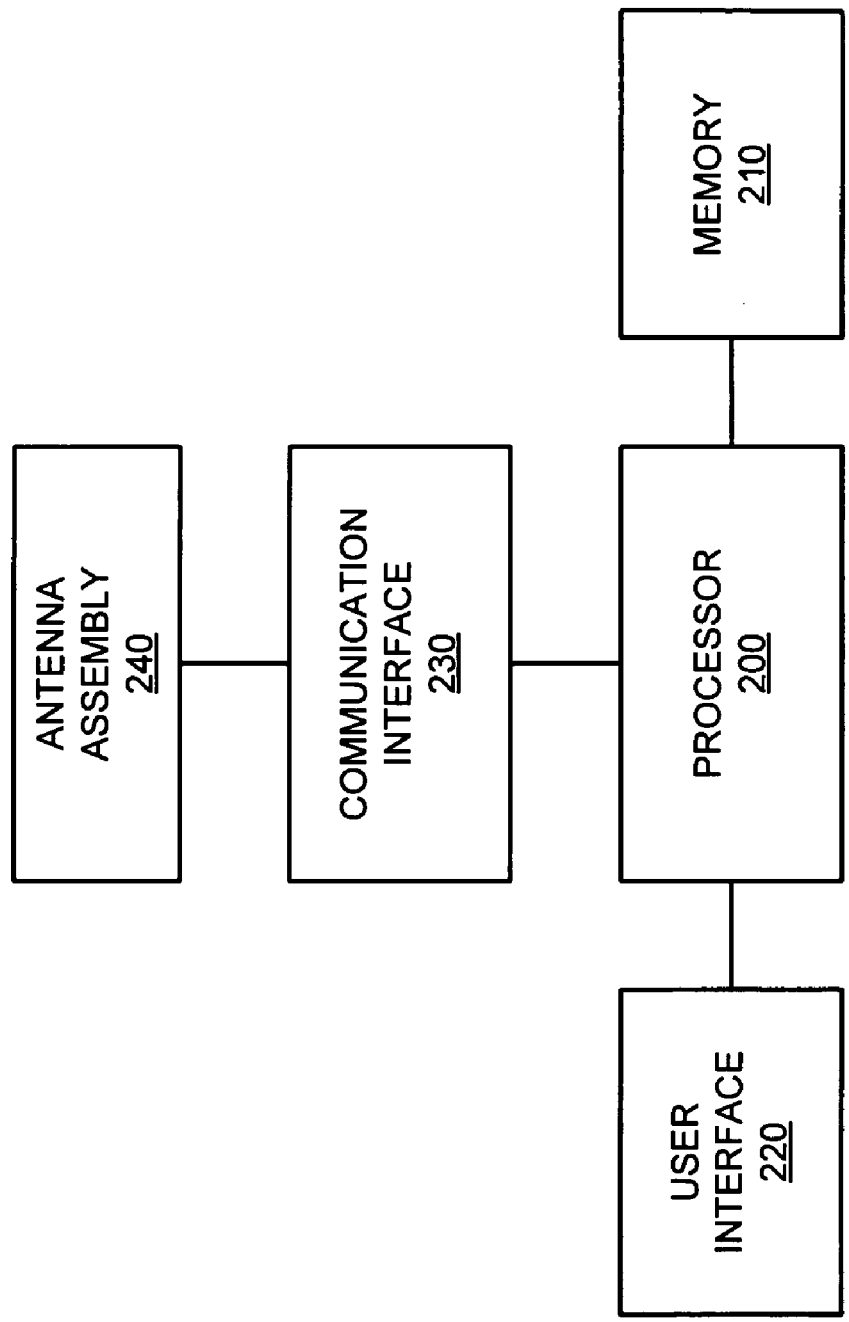
FIG. 2 illustrates a diagram of exemplary components of the device depicted in FIG. 1.

FIG. 2 illustrates a diagram of exemplary components of device 100. As illustrated, device 100 may include a processor 200, memory 210, a user interface 220, a communication interface 230, and/or an antenna assembly 240.

Processor 200 may include one or more microprocessors, application-specific integrated circuits (ASICs), field-programmable gate arrays (FPGAs), or the like. Processor 200 may control operation of device 100 and its components. In one implementation, processor 200 may control operation of components of device 100 in a manner described herein.

Memory 210 may include a random access memory (RAM), a read-only memory (ROM), and/or another type of memory to store data and instructions that may be used by processor 200.

User interface 220 may include mechanisms for inputting information to device 100 and/or for outputting information from device 100. Examples of input and output mechanisms might include buttons (e.g., control buttons, keys of a keypad, a joystick, etc.) or a touch screen interface (e.g., display 120) to permit data and control commands to be input into device 100; a speaker (e.g., speaker 130) to receive electrical signals and output audio signals; a microphone (e.g., microphone 140) to receive audio signals and output electrical signals; a display (e.g., display 120) to output visual information (e.g., text input into device 100); a vibrator to cause device 100 to vibrate; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, device 100 may perform certain operations described herein in response to processor 200 executing software instructions of an application contained in a computer-readable medium, such as memory 210. A computer-readable medium may be defined as a physical or logical memory device. A logical memory device may include memory space within a single physical memory device or spread across multiple physical memory devices. The software instructions may be read into memory 210 from another computer-readable medium or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 100, in other implementations, device 100 may contain fewer, different, differently arranged, or additional components than depicted in FIG. 2. In still other implementations, one or more components of device 100 may perform one or more other tasks described as being performed by one or more other components of device 100.

Figure 3:
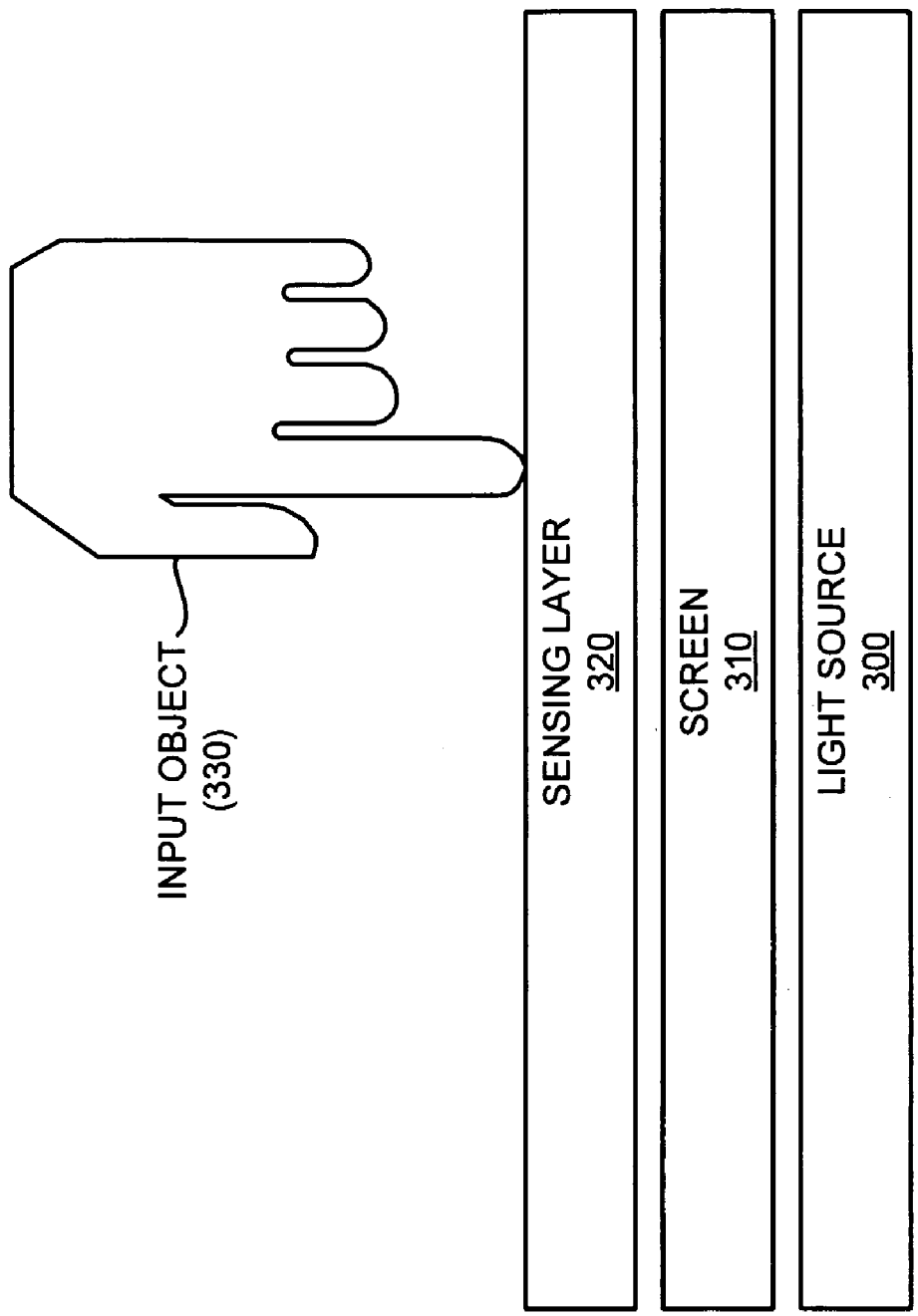
FIG. 3 depicts a diagram of exemplary components of a display (e.g., a touch screen) of the device illustrated in FIG. 1.

FIG. 3 depicts a diagram of exemplary components of display 120 of device 100. As shown, display 120 may include a light source 300, a screen 310, and/or a sensing layer 320.

Light source 300 may include a mechanism (e.g., a backlight) that provides backlighting to a lower surface of screen 310 in order to display information. For example, light source 300 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. that illuminate portions of screen 310. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, light source 300 may employ one or more diffusers or light guides to provide even lighting from an uneven source. In still another example, light source 300 can include any color light source (e.g., yellow, green, blue, white, etc.) or any combination of colored/non-colored light sources. The light provided by light source 300 may also be used to provide front lighting to an upper surface of screen 310 that faces a user.

Screen 310 may include any mechanism capable of providing visual information (e.g., text, images, video, voicemail information, incoming or outgoing calls, games, phone books, the current time, emails, etc.) to a user. For example, screen 310 may include a liquid crystal display (LCD), such as a thin film transistor (TFT) LCD, etc. In one exemplary implementation, screen 310 may include a plastic substrate that arranges TFT on a metal foil (rather than on glass), which may permit screen 310 to recover its original shape after being bent. Screen 310 may include a color filter coated onto the plastic substrate, which may permit screen 310 to display color images. In other implementations, screen 310 may include a monochrome LCD.

In one implementation, screen 310 may include any number of color and/or monochrome pixels. In another implementation, screen 310 may include a passive-matrix structure or an active-matrix structure. In a further implementation, if screen 310 is a color array, each pixel may be divided into three cells, or subpixels, which may be colored red, green, and blue by additional filters (e.g., pigment filters, dye filters, metal oxide filters, etc.). Each subpixel may be controlled independently to yield numerous possible colors for each pixel. In other implementations, each pixel of screen 310 may include more or less than three subpixels of various colors other than red, green, and blue.

Sensing layer 320 may include a mechanism that detects the presence of an input object (or mechanism) 330 (e.g., a user's finger, a stylus, etc.) on display 120, detects the location (or touch area) of input object 330 on display 120, determines how many fingers a user has on display 120, etc. For example, sensing layer 320 may include a layer of capacitive material (e.g., provided under a protective covering (not shown)) that may experience a change in electrical charges (e.g., a change in the amount of charge stored) when finger 330 contacts sensing layer 320. In one exemplary implementation, sensing layer 320 may include self capacitance circuitry that includes an array of electrodes and monitors changes in the array of electrodes when a user contacts sensing layer 320 (e.g., with finger 330). In another exemplary implementation, sensing layer 320 may include a layer of driving lines that carry current, and a separate layer of sensing lines that detect changes in electrical charge when a user contacts sensing layer 320.

Sensing layer 320 may sense a change associated with its electrical properties every time a user contacts sensing layer 320, and may provide this information to processor 200 and/or memory 210. Processor 200 may utilize this information to determine a shape, a size, and/or a location of a user's finger (or fingers) on display 120.

Although FIG. 3 shows exemplary components of display 120, in other implementations, display 120 may contain fewer, different, differently arranged, or additional components than depicted in FIG. 3. In still other implementations, one or more components of display 120 may perform one or more other tasks described as being performed by one or more other components of display 120.

Figure 4:
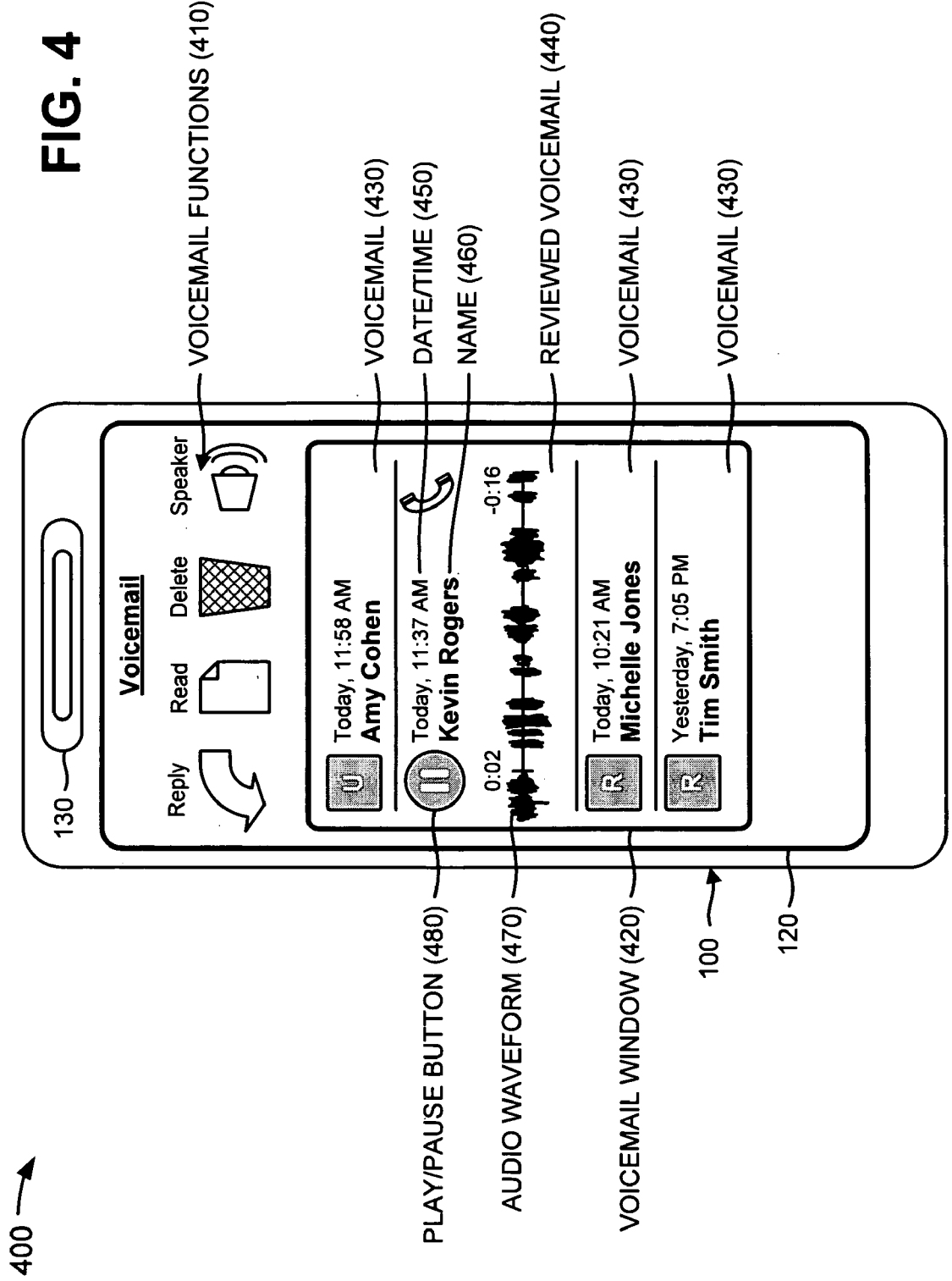
FIG. 4 illustrates a diagram of an exemplary voicemail user interface capable of being generated by the device depicted in FIG. 1.

FIG. 4 illustrates a diagram of an exemplary voicemail user interface 400 capable of being generated by device 100 (e.g., and displayed via display 120). Display 120 may include the features described above in connection with FIGS. 1 and 3. User interface 400 depicted in FIG. 4, and user interfaces 500-900 depicted in FIGS. 5-9 (collectively referred to as "the user interfaces"), may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input object 330), and may be user-configurable (e.g., a user may change the size of the user interfaces, information displayed in the user interfaces, color schemes used by the user interfaces, positions of text, images, icons, windows, etc., in the user interfaces, etc.).

As further shown in FIG. 4, user interface 400 may include voicemail functions 410 and a voicemail window 420. A "window," as used herein, is intended to be broadly interpreted to include any display mechanism (e.g., a window, a menu, etc.) capable of being displayed by display 120 and of displaying information (e.g., voicemail information) received by device 100. For example, a window may include an enclosed area on a display screen (e.g., display 120) that may display information and/or may permit execution of an application (e.g., by device 100).

Voicemail functions 410 may include one or more mechanisms for managing voicemails received by device 100. For example, voicemail functions 410 may include a speaker mechanism that, when selected, enables a user associated with device 100 to play a voicemail via speaker 130, and a delete mechanism that, when selected, enables the user (e.g., via device 100) to delete one or more voicemails. Voicemail functions 410 may also include a read mechanism that, when selected, enables the user (e.g., via device 100) to read text associated with one or more voicemails, and a reply mechanism that, when selected, enables the user (e.g., via device 100) to reply to one or more voicemails (e.g., via a voicemail, a phone call, a text message, etc.).

Voicemail window 420 may include a window that displays voicemail information (e.g., one or more voicemails, information associated with voicemails, etc) received by device 100. For example, voicemail window 420 may display one or more voicemails 430. Voicemails 430 may include voicemail information, such as a date and time when a voicemail was received by device 100 (e.g., "Yesterday, 7:05 PM"), a name of a person who provided (e.g., to device 100) a voicemail (e.g., "Tim Smith"), and an indication of whether a voicemail has been reviewed (e.g., as shown by a "R") or has not been reviewed (e.g., as shown by a "U").

If the user selects one of voicemails 430, device 100 (e.g., via display 120) may provide a reviewed voicemail 440 in voicemail window 420. Reviewed voicemail 440 may include voicemail information, such as a date and time 450 when reviewed voicemail 440 was received by device 100 (e.g., "Today, 11:37 AM"), and a name 460 of a person who provided (e.g., to device 100) reviewed voicemail 440 (e.g., "Kevin Rogers"). Reviewed voicemail 440 may also include an audio waveform 470 and a play/pause button 480. Audio waveform 470 may provide a visual representation of audio information associated with reviewed voicemail 440. For example, audio waveform 470 may include a transmitted sound or signal, a graph showing activity and frequency response of a recorded sound (e.g., reviewed voicemail 440), etc. In one implementation, audio waveform 470 may be manipulated by the user of device 100 in a manner described herein. Play/pause button 480 may, when selected, enable the user to play or pause reviewed voicemail 440.

Although user interface 400 depicts a variety of voicemail information, in other implementations, user interface 400 may depict fewer, different, differently arranged, or additional information than depicted in FIG. 4. For example, although audio waveform 470 is described as being associated with a voicemail, in other implementations, audio waveform 470 may include an audio waveform associated with an audio file, streaming audio, a combination of audio files, one or more audio files with embedded links to other files, a music file, an audio book, a podcast, a video, etc. provided by device 100. An audio file may include a variety of audio file formats, including uncompressed formats (e.g., Waveform (WAV) audio format, Audio Interchange File Format (AIFF), and AU file format), formats with lossless compression (e.g., Free Lossless Audio Codec (FLAC), Monkey's Audio (APE), WavPack, Shorten, True Audio (TTA), Apple lossless, and lossless Windows Media Audio (WMA)), and/or formats with lossy compression (e.g., MP3, Vorbis, lossy WMA, and Advanced Audio Coding (AAC)).

FIGS. 5-9 depict diagrams of exemplary interactive voicemail operations capable of being performed by device 100. In one implementation, the operations described in connection with FIGS. 5-9 may be performed by processor 200 (FIG. 2). As shown in FIGS. 5-9, device 100 may include display 120. Display 120 may include the features described above in connection with FIGS. 1 and 3. In one exemplary implementation, the exemplary interactive voicemail operations described in connection with FIGS. 5-9 may be performed with a voicemail application provided by device 100 and associated with user interface 400.

Figure 5:
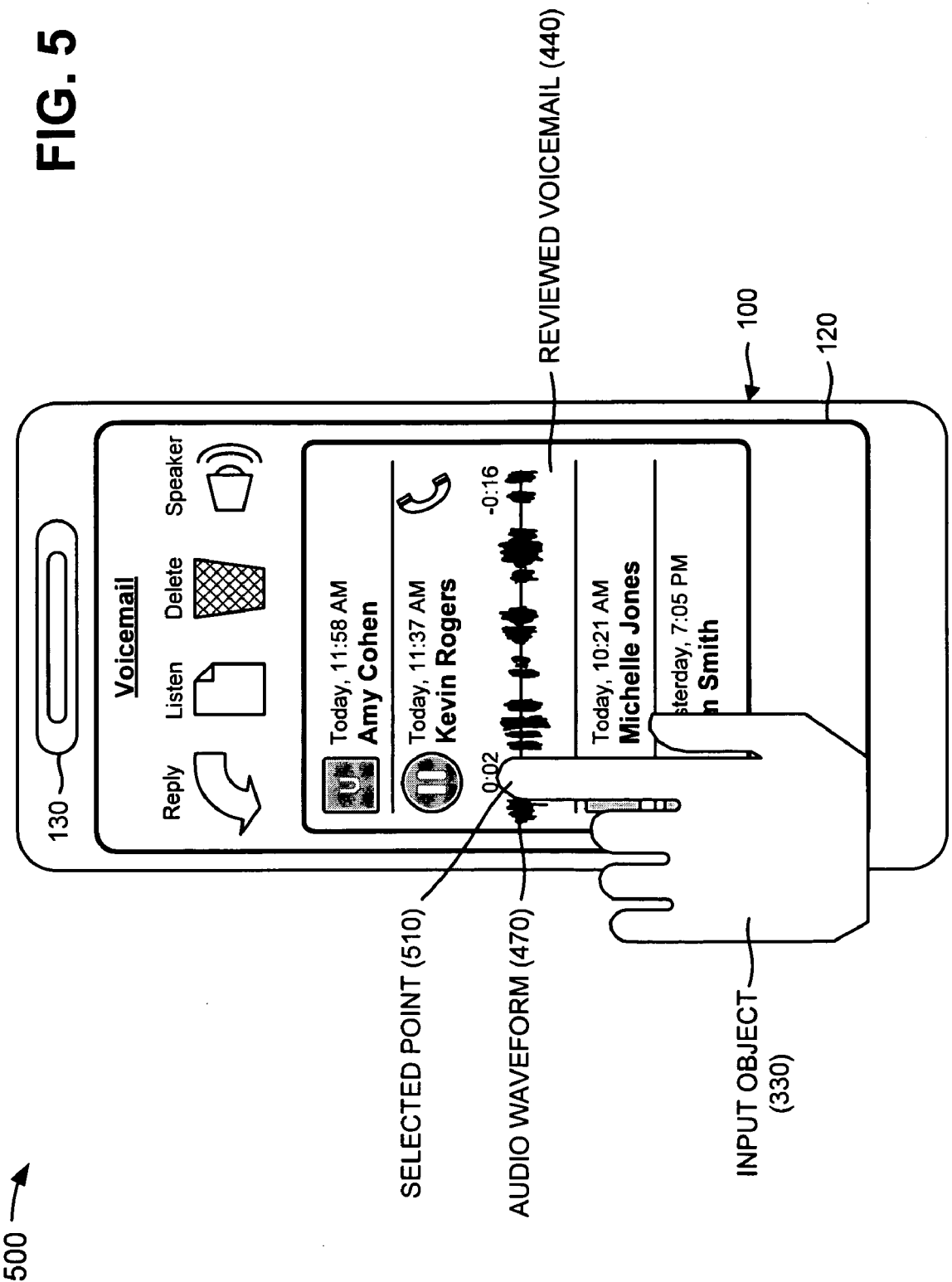
FIGS. 5-9 depict diagrams of exemplary interactive voicemail operations capable of being performed by the device illustrated in FIG. 1.

As further shown in FIG. 5, a user (e.g., via input object 330) may manipulate display 120 by selecting a point 510 associated with audio waveform 470. In one implementation, selection of point 510 may cause device 100 to begin playing audio waveform 470 from selected point 510. In other implementations, if audio waveform 470 has been paused by the user (e.g., via selection of play/pause button 480), selection of point 510 may cause device 100 to mark selected point 510 on audio waveform 470. If the user subsequently selects play/ pause button 480, device 100 may begin playing audio waveform 470 from selected point 510.

Figure 6:
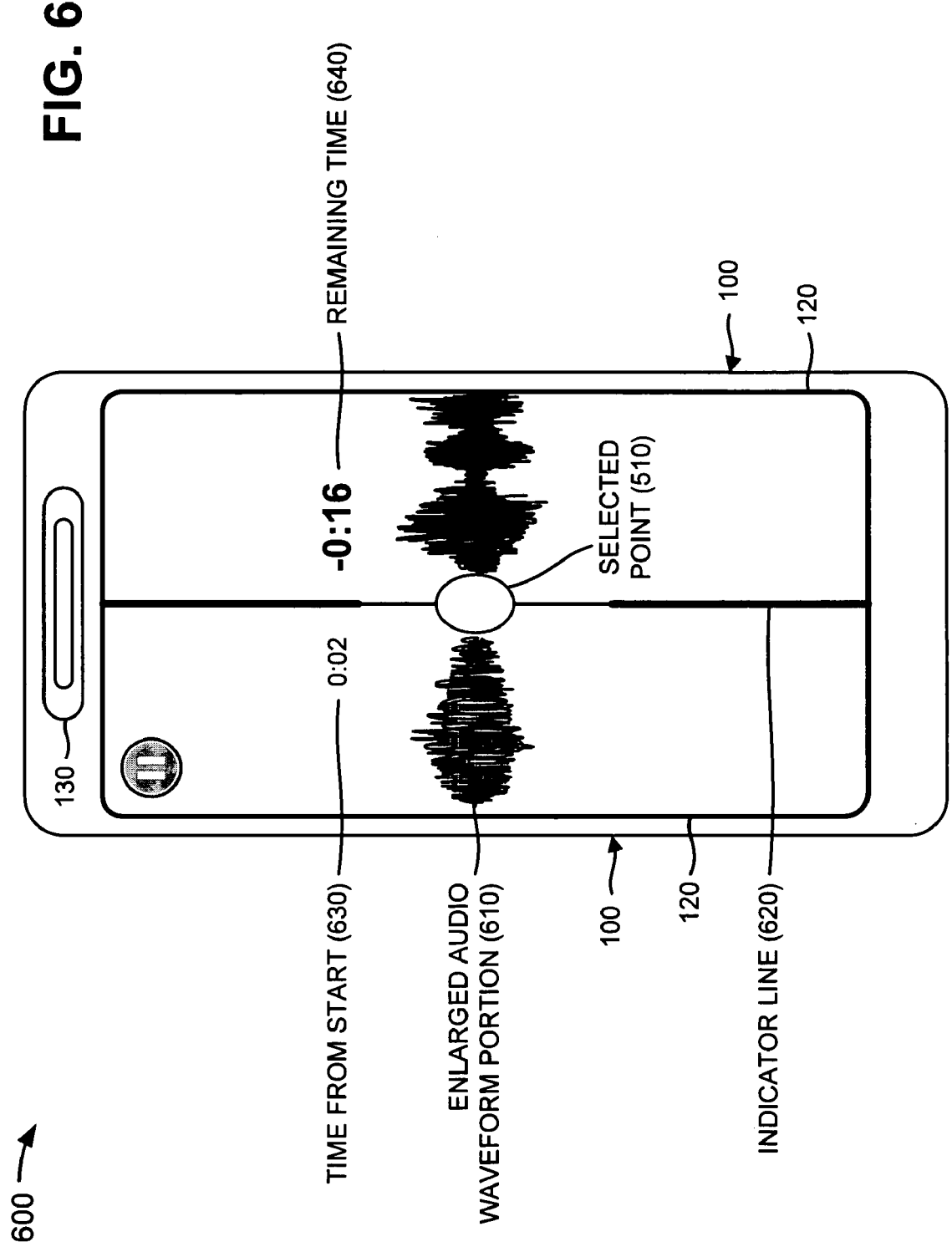

In one exemplary implementation, if the user selects point 510 and holds down (e.g., maintains or sustains contact with) selected point 510, device 100 may quickly zoom to a close-up, full-screen view of audio waveform 470, as depicted in FIG. 6. Since display 120 may be small, audio waveform 470 may be small and difficult to accurately manipulate. The close-up, full-screen view of audio waveform 470 (e.g., as shown in FIG. 6) may enable the user to accurately manipulate and control audio waveform 470. As illustrated in FIG. 6, device 100 may display (e.g., via display 120) selected point 510, an enlarged portion 610 of audio waveform 470, an indicator line 620, a time 630 from a start of audio waveform 470, and a time 640 remaining to an end of audio waveform 470. Selected point 510 may correspond to the user's contact (e.g., via input object 330) point with audio waveform 470. However, input object 330 is not shown in FIG. 6 so that other features associated with display 120 may be visible.

Enlarged audio waveform portion 610 may include an enlarged portion of audio waveform 470 (e.g., an enlarged portion of a visual representation of the audio information associated with reviewed voicemail 440). In one implementation, enlarged audio waveform 610 may be displayed in a full-screen view by display 120, as shown in FIG. 6. In other implementations, device 100 may be rotated ninety degrees and display 120 may rotate enlarged audio waveform portion 610 ninety degrees. In still other implementations, enlarged audio waveform 610 may be displayed in less than a full-screen view by display 120.

Indicator line 620 may provide a visual indication (e.g., a line) of the position of selected point 510 on enlarged audio waveform portion 610. For example, as shown in FIG. 6, indicator line 620 may divide enlarged audio waveform portion 610 into a first portion (e.g., to the left of indicator line 620) and a second portion (e.g., to the right of indicator line 620).

Time 630 may include a time that selected point 510 is from a starting point (not shown) associated with audio waveform 470. For example, as shown in FIG. 6, time 630 may indicate that selected point 510 is "0:02" seconds from the starting point of audio waveform 470. Time 640 may include a time from selected point 510 to an ending point (not shown) associated with audio waveform 470. For example, as shown in FIG. 6, time 640 may indicate that selected point 510 is "0:16" seconds from the ending point of audio waveform 470.

Figure 7:
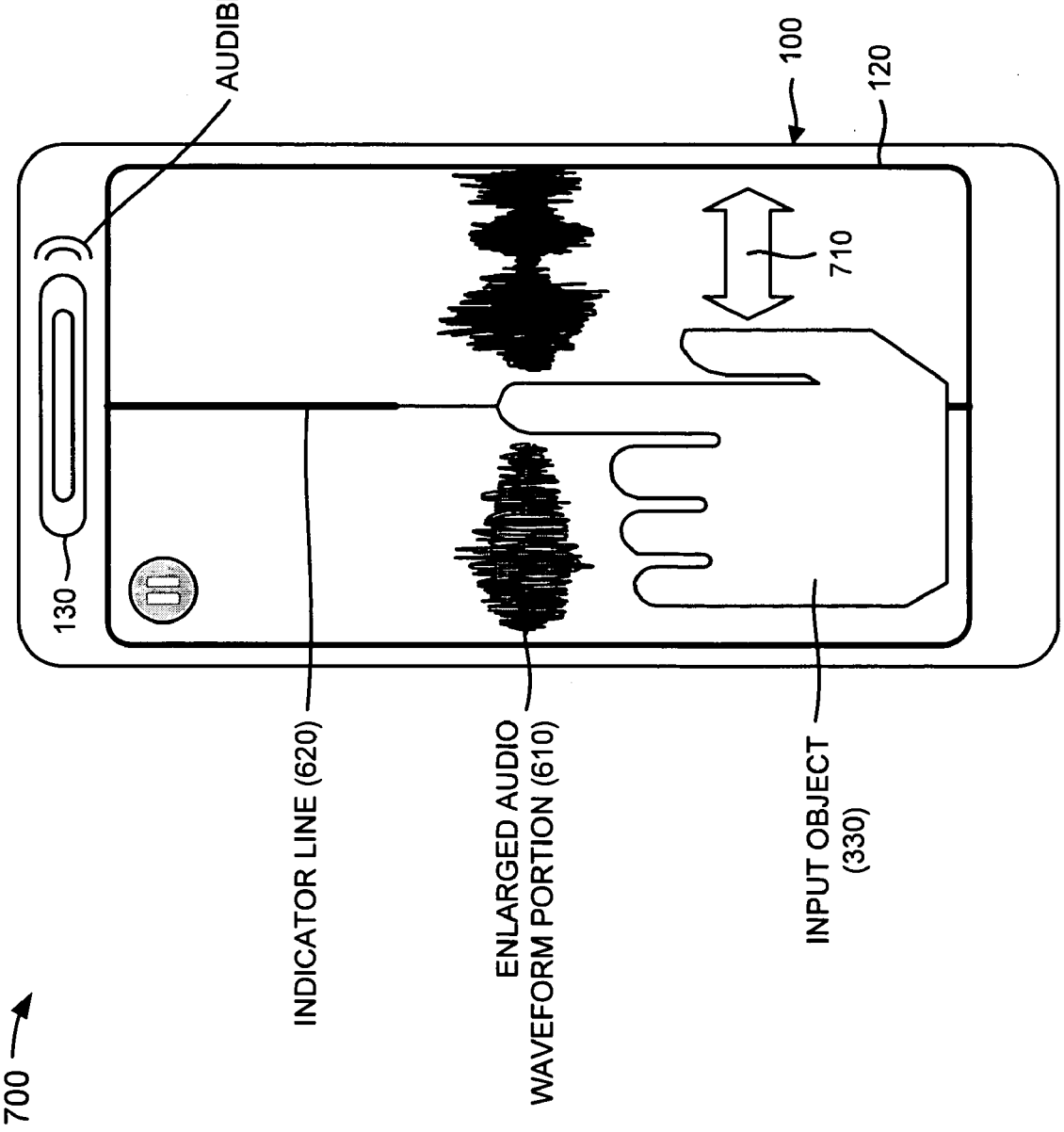

As shown in FIG. 7, the user (e.g., via input object 330) may manipulate (e.g., control) enlarged audio waveform portion 610. For example, in one implementation, the user (e.g., via input object 330) may move in one or more directions 710 (e.g., to the right or to the left) along enlarged audio waveform portion 610. As input object 330 moves along (e.g., in directions 710) enlarged audio waveform portion 610, indicator line 620 may follow the movement of input object 330 and device 100 (e.g., via speaker 130) may provide audible feedback 720 associated with one or more portions of enlarged audio waveform portion 610 being traversed by input object 330. In one example, if input object 330 moves over a particular portion (e.g., the portion to the left of indicator line 620) of enlarged audio waveform portion 610, speaker 130 may provide audible feedback 720 associated with the particular portion of enlarged audio waveform portion 610. In another example, if input object 330 moves over another portion (e.g., the portion to the right of indicator line 620) of enlarged audio waveform portion 610, speaker 130 may provide audible feedback 720 associated with the other portion of enlarged audio waveform portion 610. Audible feedback 720 may include the audio (e.g., vibrations generated by speaker 130) associated with one or more portions of enlarged audio waveform portion 610 being traversed by input object 330. Such an arrangement may provide visual (e.g., via enlarged audio waveform portion 610) and audible (e.g., via audible feedback 720) feedback to the user about the location of input object 330 on enlarged audio waveform portion 610. This may enable the user to quickly and easily locate a particular portion of audio waveform 470 that the user wants to hear.

Figure 8:
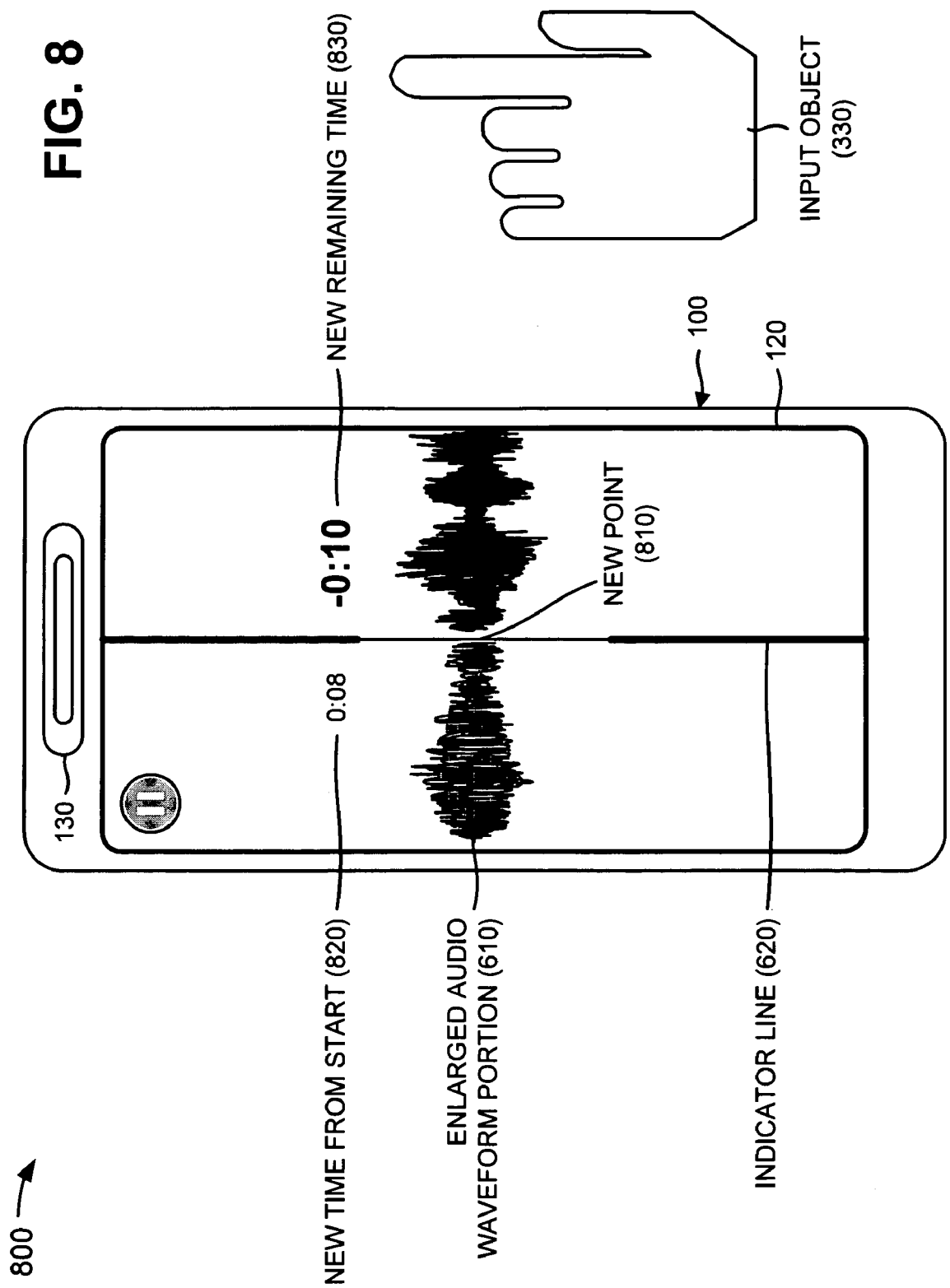

The user may continue to manipulate (e.g., via input object 330) enlarged audio waveform portion 610 until the user finds a point (e.g., a new point 810) of enlarged audio waveform portion 610 for which the user is looking, as shown in FIG. 8. As further shown in FIG. 8, device 100 may display (e.g., via display 120) new point 810, indicator line 620 at new point 810 of enlarged audio waveform portion 610, a new time 820 from the start of audio waveform 470, and a new time 830 remaining to the end of audio waveform 470.

New time 820 may include a time that new point 810 is from the starting point (not shown) associated with audio waveform 470. For example, as shown in FIG. 8, new time 820 may indicate that new point 810 is "0:08" seconds from the starting point of audio waveform 470. New time 830 may include a time from new point 810 to the ending point (not shown) associated with audio waveform 470. For example, as shown in FIG. 8, new time 830 may indicate that new point 810 is "0:10" seconds from the ending point of audio waveform 470.

Figure 9:
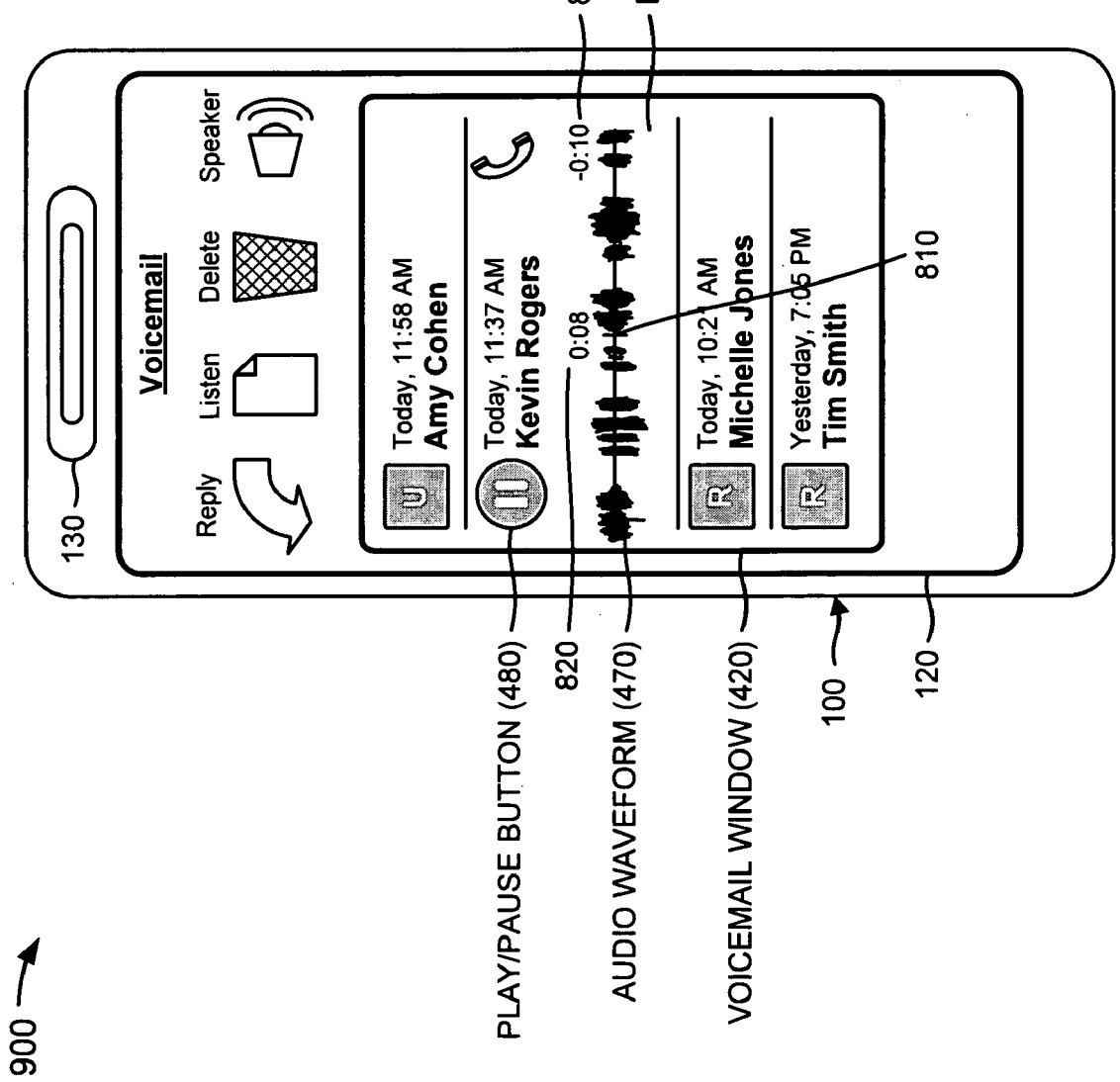

When the user finds new point 810, the user may remove (or release) input object 330 from contact with display 120 (e.g., as shown in FIG. 8) and device 100 may quickly zoom out to an original view of audio waveform 470, as depicted in user interface 900 of FIG. 9. User interface 900 may be similar to user interface 400 depicted in FIG. 4. For example, user interface 900 may display, among other things, voicemail window 420, reviewed voicemail 440, audio waveform 470, and play/pause button 480. Voicemail window 420, reviewed voicemail 440, audio waveform 470, and play/pause button 480 may include the features described above in connection with FIG. 4. However, as further shown in FIG. 9, user interface 900 may display new point 810, new time 820 from the start of audio waveform 470, and new time 830 remaining to the end of audio waveform 470. In one implementation, device 100 may automatically begin playing audio waveform 470 from new point 810. In other implementations, if audio waveform 470 has been paused by the user (e.g., via selection of play/pause button 480), the user may subsequently select play/pause button 480 and device 100 may begin playing audio waveform from new point 810.

Although FIGS. 5-9 show exemplary interactive voicemail operations associated with device 100, in other implementations, device 100 may perform fewer, different, or additional operations than depicted in FIGS. 5-9. Furthermore, although user interfaces 500-900 depict a variety of voicemail information, in other implementations, user interfaces 500-900 may depict fewer, different, differently arranged, or additional information than depicted in FIGS. 5-9.

FIGS. 10-13 depict flow charts of an exemplary process 1000 for performing interactive voicemail operations with a touch screen of a device according to implementations described herein. In one implementation, process 1000 may be performed by device 100. In another implementation, some or all of process 1000 may be performed by another device or group of devices, including or excluding device 100.

Figure 10:
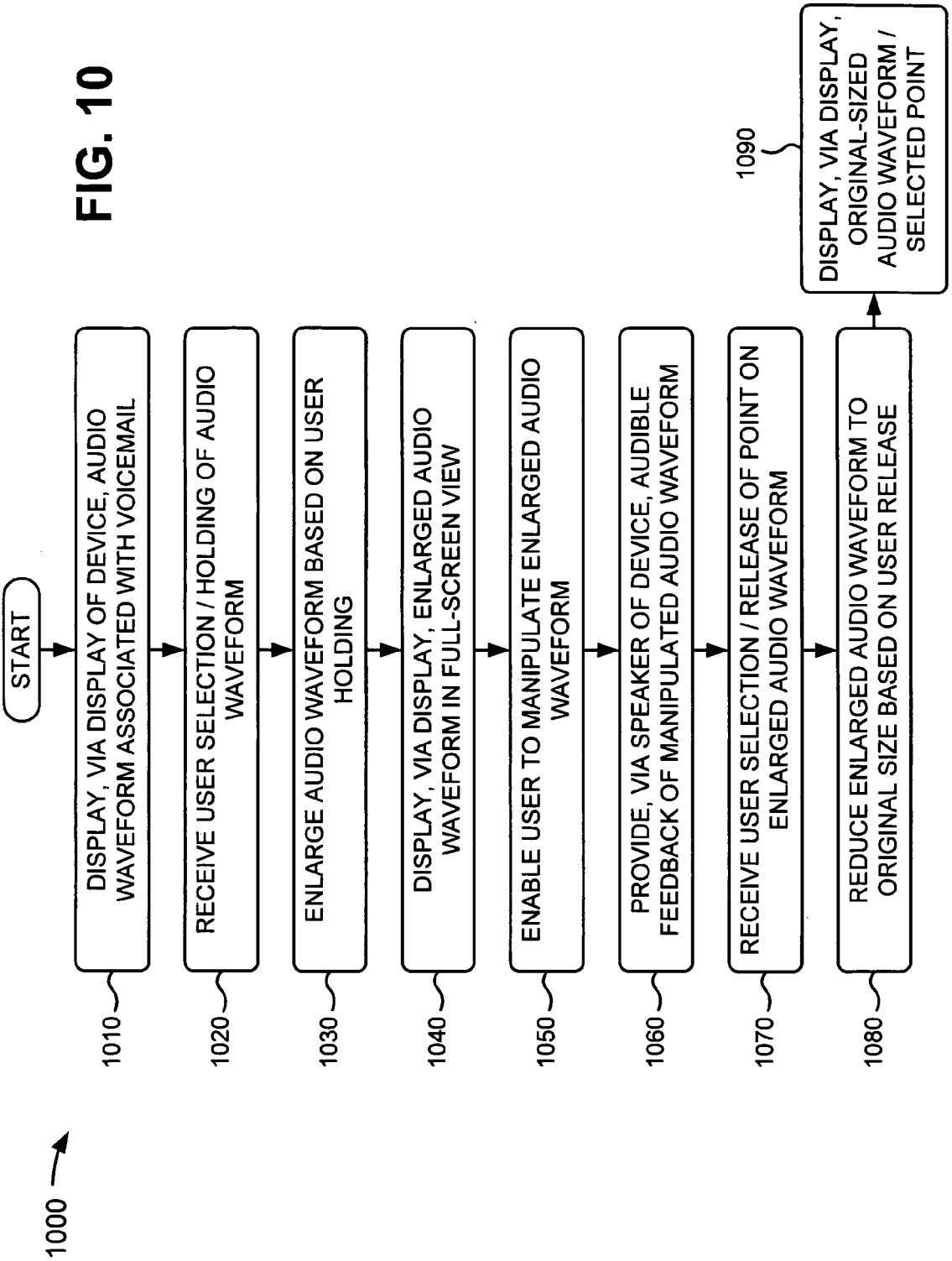

As illustrated in FIG. 10, process 1000 may begin with displaying, via a display of a device, an audio waveform associated with a voicemail (block 1010), receiving user selection and holding of the audio waveform (block 1020), and enlarging the audio waveform based on the user holding of the audio waveform (block 1030). For example, in implementations described above in connection with FIGS. 4-6, display 120 of device 100 may display reviewed voicemail 440. Reviewed voicemail 440 may include audio waveform 470 and play/pause button 480. Audio waveform 470 may provide a visual representation of the audio information associated with reviewed voicemail 440. A user (e.g., via input object 330) may manipulate display 120 by selecting point 510 associated with audio waveform 470 of reviewed voicemail 440. In one example, if audio waveform 470 has been paused by the user (e.g., via selection of play/pause button 480), selection of point 510 may cause device 100 to mark selected point 510 on audio waveform 470. If the user selects point 510 and holds down (e.g., maintains or sustains contact with) selected point 510, device 100 may quickly zoom to a close-up, full-screen view of audio waveform 470.

As further shown in FIG. 10, the enlarged audio waveform may be displayed, via the display, in a substantially full-screen view (block 1040), the user may be enabled to manipulate the enlarged audio waveform (block 1050), and audible feedback associated with the manipulated audio waveform may be provided via a speaker of the device (block 1060). For example, in implementations described above in connection with FIGS. 6 and 7, if the user selects point 510 and holds down (or maintains contact with) selected point 510, device 100 may quickly zoom to a close-up, full-screen view of audio waveform 470. The close-up, full-screen view of audio waveform 470 may enable the user to accurately manipulate and control audio waveform 470. In one example, the user (e.g., via input object 330) may move in one or more directions 710 (e.g., to the right or to the left) along enlarged audio waveform portion 610. As input object 330 moves along (e.g., in directions 710) enlarged audio waveform portion 610, device 100 (e.g., via speaker 130) may provide audible feedback 720 associated with one or more portions of enlarged audio waveform portion 610 being traversed by input object 330. Such an arrangement may provide visual (e.g., via enlarged audio waveform portion 610) and audible (e.g., via audible feedback 720) feedback to the user about the location of input object 330 on enlarged audio waveform portion 610. This may enable the user to quickly and easily locate a particular portion of audio waveform 470 that the user wants to hear.

Returning to FIG. 10, user selection and release of a point on the enlarged audio waveform may be received (block 1070), the enlarged audio waveform may be reduced to an original size based on the user release of the point (block 1080), and the original-sized audio waveform and the selected point may be displayed via the display (block 1090). For example, in implementations described above in connection with FIGS. 8 and 9, the user may continue to manipulate (e.g., via input object 330) enlarged audio waveform portion 610 until the user finds a point (e.g., new point 810) of enlarged audio waveform portion 610 for which the user is looking. When the user finds new point 810, the user may remove (or release) input object 330 from contact with display 120 and device 100 may quickly zoom out to an original view of audio waveform 470, as depicted in user interface 900. User interface 900 may display new point 810, new time 820 from the start of audio waveform 470, and new time 830 remaining to the end of audio waveform 470.

Figure 11:
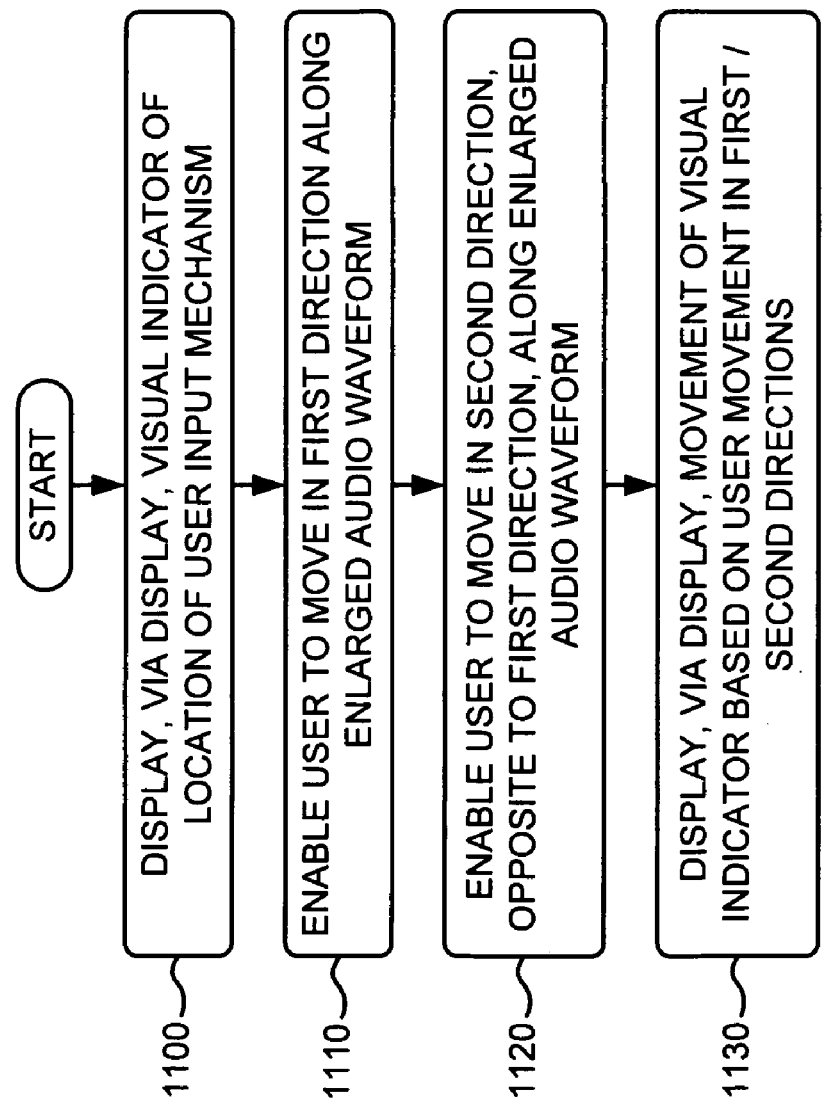

Process block 1050 may include the process blocks illustrated in FIG. 11. As shown in FIG. 11, process block 1050 may include displaying, via the display, a visual indicator of a location of a user input mechanism (block 1100), enabling the user to move in a first direction along the enlarged audio waveform (block 1110), enabling the user to move in a second direction, opposite to the first direction, along the enlarged audio waveform (block 1120), and displaying, via the display, movement of the visual indicator based on user movement in one of the first direction or the second direction (block 1130). For example, in implementations described above in connection with FIGS. 6 and 7, device 100 may display (e.g., via display 120) indicator line 620 that may provide a visual indication (e.g., a line) of the position of selected point 510 on enlarged audio waveform portion 610. The user (e.g., via input object 330) may manipulate (e.g., control) enlarged audio waveform portion 610. In one example, the user (e.g., via input object 330) may move in one or more directions 710 (e.g., to the right or to the left) along enlarged audio waveform portion 610. As input object 330 moves along (e.g., in directions 710) enlarged audio waveform portion 610, indicator line 620 may follow the movement of input object 330.

Figure 12:
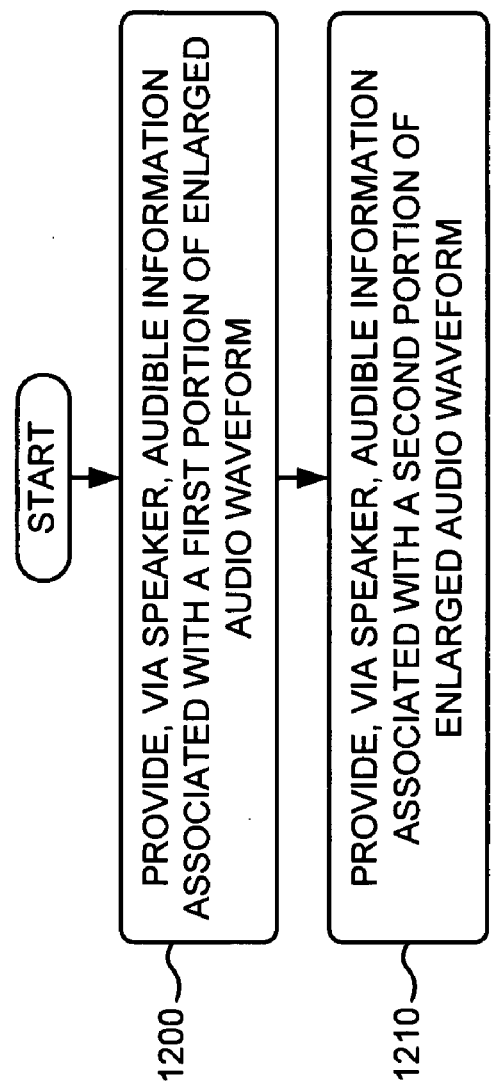

Process block 1060 may include the process blocks illustrated in FIG. 12. As shown in FIG. 12, process block 1060 may include providing, via the speaker, audible information associated with a first portion of the enlarged audio waveform (block 1200) and/or providing, via the speaker, audible information associated with a second portion of the enlarged audio waveform (block 1220). For example, in implementations described above in connection with FIG. 7, as input object 330 moves along (e.g., in directions 710) enlarged audio waveform portion 610, device 100 (e.g., via speaker 130) may provide audible feedback 720 associated with one or more portions of enlarged audio waveform portion 610 being traversed by input object 330. In one example, if input object 330 moves over a particular portion (e.g., the portion to the left of indicator line 620) of enlarged audio waveform portion 610, speaker 130 may provide audible feedback 720 associated with the particular portion of enlarged audio waveform portion 610. In another example, if input object 330 moves over another portion (e.g., the portion to the right of indicator line 620) of enlarged audio waveform portion 610, speaker 130 may provide audible feedback 720 associated with the other portion of enlarged audio waveform portion 610.

Process block 1090 may include the process blocks illustrated in FIG. 13. As shown in FIG. 13, process block 1090 may include displaying, via the display, voicemail information with the original-sized audio waveform and the selected point (block 1300), and one of automatically playing, via the speaker, audible information associated with the audio waveform from the selected point (1310) or playing, via the speaker, the audible information associated with the audio waveform, from the selected point, based on user input (block 1320). For example, in implementations described above in connection with FIG. 9, user interface 900 may display new point 810, new time 820 from the start of audio waveform 470, and new time 830 remaining to the end of audio waveform 470. In one example, device 100 may automatically begin playing audio waveform 470 from new point 810. In another example, if audio waveform 470 has been paused by the user (e.g., via selection of play/pause button 480), the user may subsequently select play/pause button 480 and device 100 may begin playing audio waveform from new point 810.

Systems and/or methods described herein may enable a user to interact with voicemail information displayed by a touch screen of a mobile communication device (e.g., a cell phone, a PDA, etc.). The systems and/or methods may enable the user to zoom in on an audio waveform associated with the voicemail information, to manipulate the audio waveform (e.g., move to different portions of the audio waveform), and to zoom out from the audio waveform. Such an arrangement may enable the user to visually manipulate the audio waveform, in an accurate manner, using a small touch screen-based device.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 10-13, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A mobile communication device-implemented method, comprising:
   displaying, via a display associated with the mobile communication device, an audio waveform associated with a voicemail received by the mobile communication device;
   receiving selection and sustained contact with the audio waveform from a user associated with the mobile communication device;
   enlarging a portion of the audio waveform based on the user selection and sustained contact with the audio waveform;
   displaying, via the display, the enlarged portion of the audio waveform;
   enabling the user to manipulate, via the display, the enlarged portion of the audio waveform;
   displaying, via the display, a visual indicator of a location of a user input mechanism on the display;
   enabling, via the display, the user to move the user input mechanism along the enlarged portion of the audio waveform;
   displaying, via the display, movement of the visual indicator based on movement of the user input mechanism by the user; and
   providing, via a speaker associated with the mobile communication device, audible feedback associated with the enlarged portion of the audio waveform.

2. The mobile communication device-implemented method of claim 1, further comprising:
   receiving, from the user, selection and release of a point on the enlarged portion of the audio waveform;
   reducing the enlarged portion of the audio waveform to an original size based on the user release of the selected point on the enlarged portion of the audio waveform; and
   displaying, via the display, the original-sized audio waveform and the selected point.

3. The mobile communication device-implemented method of claim 2, where displaying, via the display, the original-sized audio waveform and the selected point further comprises:
   displaying, via the display, information associated with the voicemail received by the mobile communication device; and
   providing, automatically via the speaker, audible information associated with the audio waveform from the selected point.

4. The mobile communication device-implemented method of claim 3, where the information associated with the voicemail comprises one or more of:
   a date when the voicemail was received by the mobile communication device,
   a time when the voicemail was received by the mobile communication device, or
   a name of a person who provided the voicemail to the mobile communication device.

5. The mobile communication device-implemented method of claim 2, where displaying, via the display, the original-sized audio waveform and the selected point further comprises:
   displaying, via the display, information associated with the voicemail received by the mobile communication device;
   receiving, from the user, an input to play the audio waveform; and
   providing, via the speaker, audible information associated with the audio waveform, from the selected point, based on the user input.

6. The mobile communication device-implemented method of claim 5, where the information associated with the voicemail comprises one or more of:
   a date when the voicemail was received by the mobile communication device,
   a time when the voicemail was received by the mobile communication device, or
   a name of a person who provided the voicemail to the mobile communication device.

7. The mobile communication device-implemented method of claim 1, where providing, via a speaker associated with the mobile communication device, audible feedback comprises:
   providing, via the speaker, audible information associated with one or more portions of the enlarged portion of the audio waveform selected by the user.

8. The mobile communication device-implemented method of claim 1, where the mobile communication device comprises one or more of:
   a radiotelephone,
   a personal communications system (PCS) terminal, a personal digital assistant (PDA),
a portable gaming system,
a global positioning system (GPS) device, or
a media playing device.

9. The mobile communication device-implemented method of claim 1, where the display comprises a touch screen display.

10. A mobile communication device comprising:
a display;
a speaker;
a memory to store a plurality of instructions; and
a processor to execute instructions in the memory to:
   display, via the display, an audio waveform associated with a voicemail received by the mobile communication device,
   receive a sustained contact with the audio waveform by a user associated with the mobile communication device,
   enlarge a portion of the audio waveform based on the sustained contact with the audio waveform,
   display, via the display, the enlarged portion of the audio waveform,
   enable the user to manipulate, via the display, the enlarged portion of the audio waveform, and
   provide, via the speaker, audible feedback associated with the enlarged portion of the audio waveform,
where the processor further executes instructions in the memory to:
   display, via the display, a visual indicator of a location of a user input mechanism on the display,
   enable, via the display, the user to move the user input mechanism along the enlarged portion of the audio waveform, and
   display, via the display, movement of the visual indicator based on movement of the user input mechanism by the user.

11. The mobile communication device of claim 10, where the processor further executes instructions in the memory to:
   receive, from the user, selection and release of a point on the enlarged portion of the audio waveform,
   reduce the enlarged portion of the audio waveform to an original size based on the user release of the selected point on the enlarged portion of the audio waveform, and
   display, via the display, the original-sized audio waveform and the selected point.

12. The mobile communication device of claim 11, where, when displaying, via the display, the original-sized audio waveform and the selected point, the processor further executes instructions in the memory to:
   display, via the display, information associated with the voicemail received by the mobile communication device, and
   provide, automatically via the speaker, audible information associated with the audio waveform from the selected point.

13. The mobile communication device of claim 12, where the information associated with the voicemail comprises one or more of:
   a date when the voicemail was received by the mobile communication device,
   a time when the voicemail was received by the mobile communication device, or
   a name of a person who provided the voicemail to the mobile communication device.

14. The mobile communication device of claim 11, where, when displaying, via the display, the original-sized audio waveform and the selected point, the processor further executes instructions in the memory to:
   display, via the display, information associated with the voicemail received by the mobile communication device,
   receive, from the user, an input to play the audio waveform, and
   provide, via the speaker, audible information associated with the audio waveform, from the selected point, based on the user input.

15. The mobile communication device of claim 14, where the information associated with the voicemail comprises one or more of:
   a date when the voicemail was received by the mobile communication device,
   a time when the voicemail was received by the mobile communication device, or
   a name of a person who provided the voicemail to the mobile communication device.

16. The mobile communication device of claim 10, where, when providing, via the speaker, audible feedback, the processor further executes instructions in the memory to:
   provide, via the speaker, audible information associated with one or more portions of the enlarged portion of the audio waveform selected by the user.

17. The mobile communication device of claim 10, where the mobile communication device comprises one or more of:
   a radiotelephone,
   a personal communications system (PCS) terminal,
   a personal digital assistant (PDA),
   a portable gaming system,
   a global positioning system (GPS) device, or
   a media playing device.

18. The mobile communication device of claim 10, where the display comprises a touch screen display.

19. The mobile communication device of claim 10, where the audible feedback associated with the manipulated enlarged portion of the audio waveform enables the user to locate a particular portion of the audio waveform.

20. A memory device to store instructions that are executable by a processor of computer device, the instructions comprising:
   one or more instructions to display, via display associated with the computer device, an audio waveform associated with an audio file received by the computer device;
   one or more instructions to detect an input, from a user associated with the computer device, of the displayed audio waveform;
   one or more instructions to enlarge a displayed portion of the audio waveform, where the enlarged portion is associated with the detected user input;
   one or more instructions to display, via the display, the enlarged portion of the audio waveform;
   one or more instructions to enable the user to manipulate, via the display, the enlarged portion of the audio waveform;
   one or more instructions to display, via the display, a visual indicator of a location of a user input mechanism on the display;
   one or more instructions to enable, via the display, the user to move the user input mechanism along the enlarged portion of the audio waveform;
   one or more instructions to display, via the display, movement of the visual indicator based on movement of the user input mechanism by the user; and one or more instructions to provide, via a speaker associated with the computer device, audible feedback associated with the manipulated enlarged portion of the audio waveform.

21. The memory device of claim 20, where the instructions further comprise:
   one or more instructions to receive, from the user, selection and release of a point on the enlarged portion of the audio waveform;
   one or more instructions to reduce the enlarged portion of the audio waveform to an original size based on the user release of the selected point on the enlarged portion of the audio waveform; and
   one or more instructions to display, via the display, the original-sized audio waveform and the selected point.

22. The memory device of claim 21, where the one or more instructions to display the original-sized audio waveform and the selected point further comprise:
   one or more instructions to display, via the display, information associated with the audio file received by the computer device; and
   one or more instructions to provide, automatically via the speaker, audible information associated with the audio waveform from the selected point.

23. The memory device of claim 22, where the information associated with the audio file includes one or more of:
   a date when the audio file was received by the computer device,
   a time when the audio file was received by the computer device, or
   a name of a person who provided the audio file to the computer device.

24. The memory device of claim 21, where the one or more instructions to display, via the display, the original-sized audio waveform and the selected point further comprise:
   one or more instructions to display, via the display, information associated with the audio file received by the computer device;
   one or more instructions to receive, from the user, an input to play the audio waveform; and
   one or more instructions to provide, via the speaker, audible information associated with the audio waveform, from the selected point, based on the user input.

25. The memory device of claim 24, where the information associated with the audio file comprises one or more of:
   a date when the audio file was received by the computer device,
   a time when the audio file was received by the computer device, or
   a name of a person who provided the audio file to the computer device.

26. The memory device of claim 20, where the one or more instructions to provide, via a speaker associated with the computer device, audible feedback include:
   one or more instructions to provide, via the speaker, audible information associated with one or more portions of the enlarged portion of the audio waveform selected by the user.

* * * * *